L. H. DICKELMAN.
GRAIN STORAGE BIN.
APPLICATION FILED MAY 14, 1918.

1,339,437.  
Patented May 11, 1920.  
3 SHEETS—SHEET 1.

WITNESSES  
J. P. Schrott

INVENTOR  
Lizzie H. Dickelman  
BY Munn & Co.  
ATTORNEYS

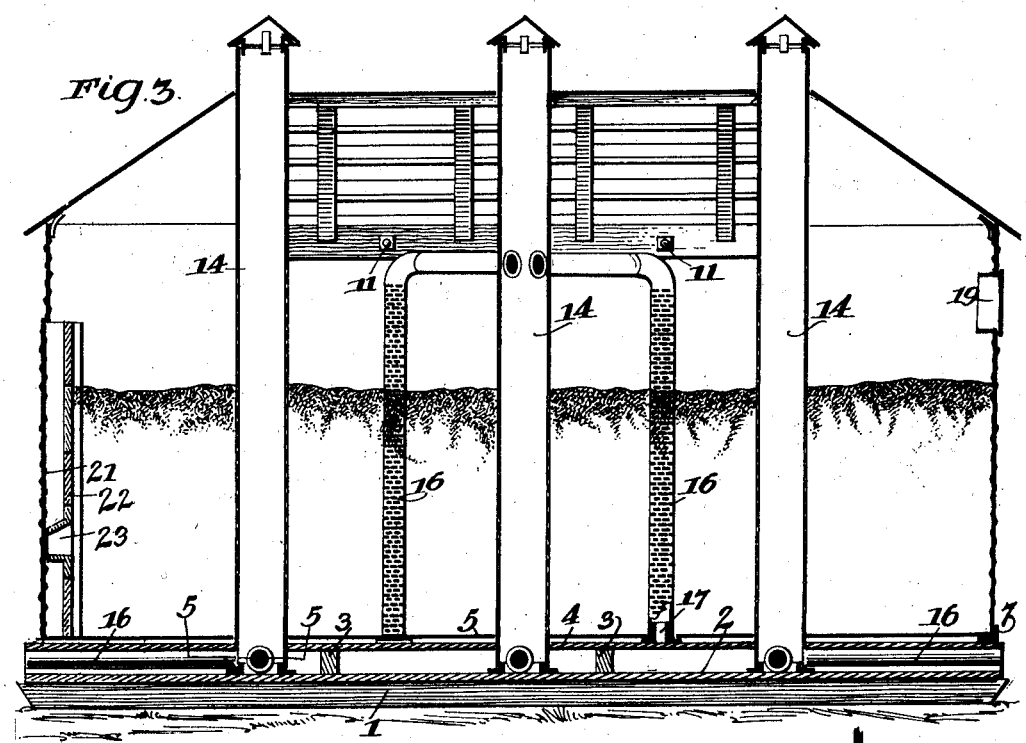
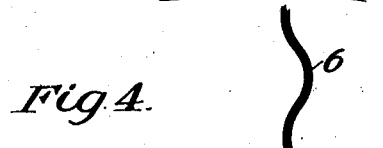
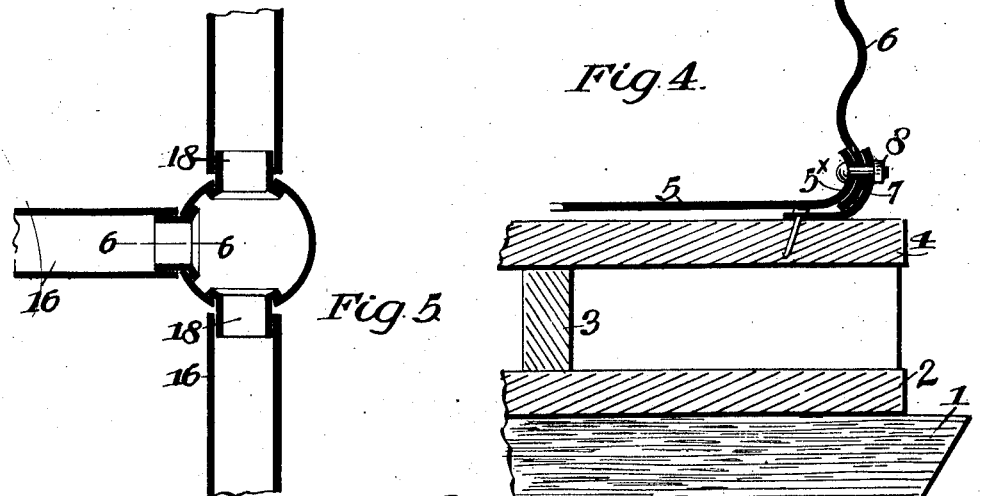
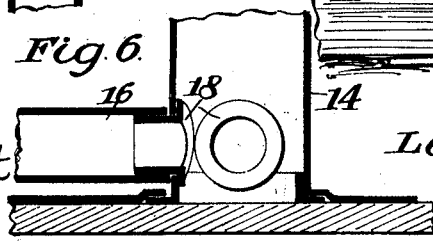

L. H. DICKELMAN.
GRAIN STORAGE BIN.
APPLICATION FILED MAY 14, 1918.
1,339,437. Patented May 11, 1920.
3 SHEETS—SHEET 3.
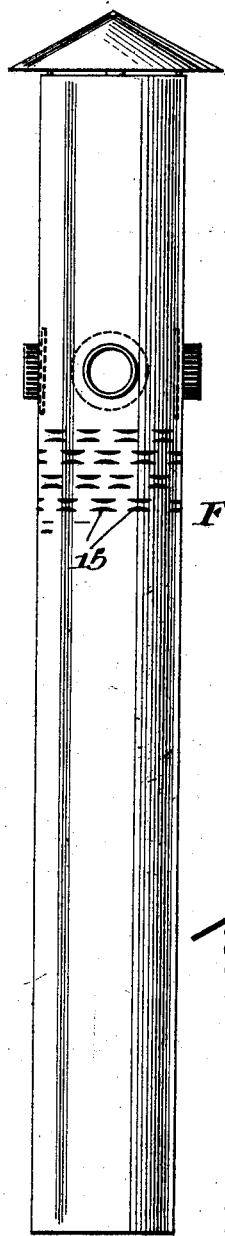
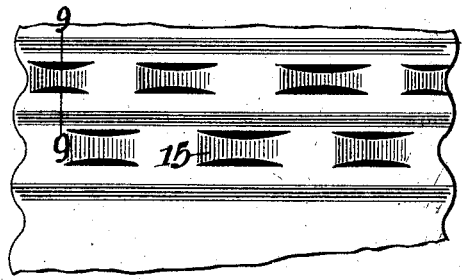
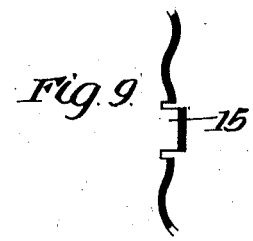
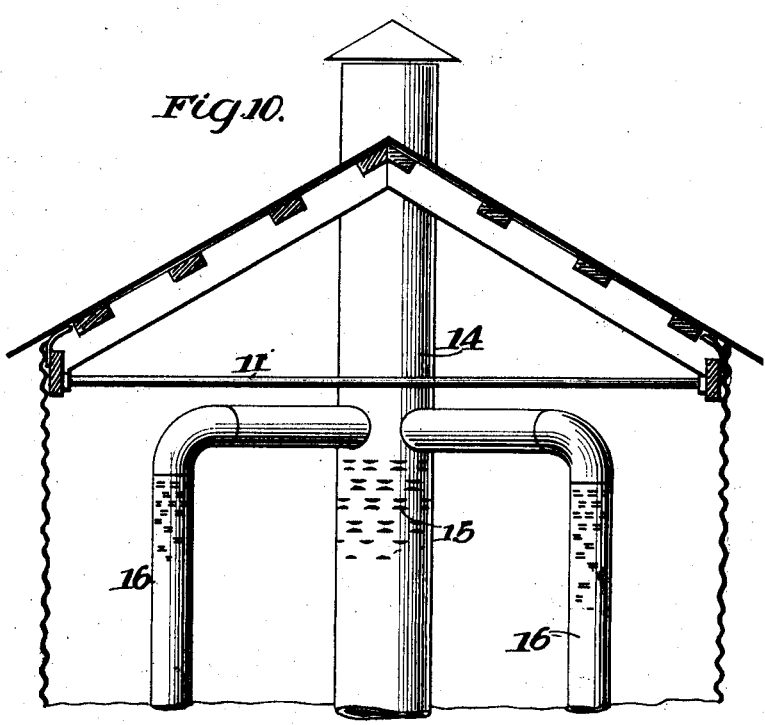
WITNESSES
J. S. Schrott
INVENTOR
Lizzie H. Dickelman
BY
ATTORNEYS

UNITED STATES PATENT OFFICE.

LIZZIE H. DICKELMAN, OF FOREST, OHIO.

GRAIN-STORAGE BIN.

1,339,437.  Specification of Letters Patent.  Patented May 11, 1920.

Application filed May 14, 1918. Serial No. 234,441.

*To all whom it may concern:*

Be it known that I, LIZZIE H. DICKELMAN, residing at Forest, in the county of Hardin and State of Ohio, have invented certain new and useful Improvements in Grain-Storage Bins.

My invention relates to improvements in grain storage bins and is more particularly directed to bins for storing rice, and it consists in the combinations, constructions and arrangements herein described and claimed.

An object of my invention is to provide a storage bin which is composed largely of sheet metal and which is provided with means for ventilating the rice or grain while at the same time preventing the admission of sufficient air containing moisture, which might be detrimental to the grain.

A further object of my invention is to provide a portable grain bin having means for automatically ventilating the rice or grain thereby preventing the overheating of the same, and obviating the necessity of "turning over" the grain or handling it otherwise to prevent such overheating.

Other objects and advantages will appear in the following specification and the novel features of the invention will be particularly pointed out in the appended claims.

My invention is illustrated in the accompanying drawings forming a part of this application, in which:

Figure 1 is a perspective view a portion being broken away to show the interior, Fig. 2 is a horizontal section taken substantially on the line 2—2 of Fig. 1, Fig. 3 is a vertical section on the line 3—3 of Fig. 2, Fig. 4 is a detail section showing the means for securing the bottom to the side walls, Fig. 5 is a section on the line 5—5 of Fig. 3.

Fig. 6 is a section on the line 6—6 of Fig. 5,

Fig. 7 is a side elevation of one of the central pipes,

Fig. 8 is a detail view of a portion of the central pipe,

Fig. 9 is a section on the line 9—9 of Fig. 8, and

Fig. 10 is a vertical cross section of the bin.

Figure 1:
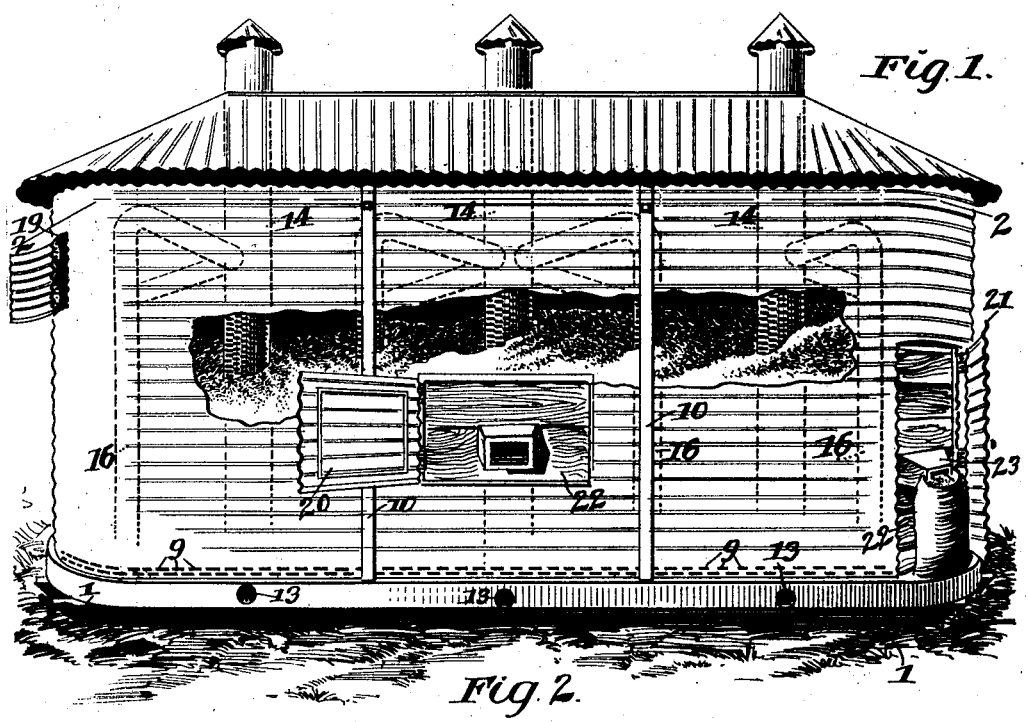
Figure 2:
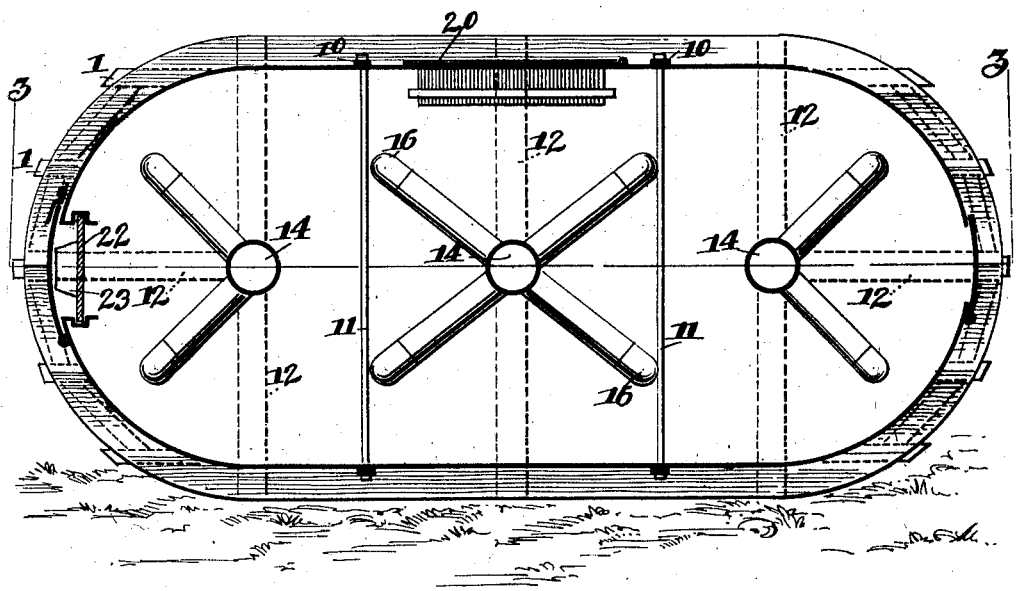

In carrying out my invention I provide for the smaller sizes of the cribs skids or runners 1 upon which is mounted a subflooring 2, girders 3 being carried by the floor portion 2. Mounted on the girders is a flooring 4 which is made of wood and which is designed to support the metal flooring 5.

The side walls of the bin are made of corrugated sheet metal plates such as those shown at 6 these plates being bolted together. They are connected to the bottom by means of lugs 7, preferably by passing bolts 8 through the lugs through the bottom portion of the plates 6 and through an upturned or flanged portion $5^x$ of the metal portion 5. As will be seen from Fig. 1 the side walls are provided with one or more rows of perforations 9, whose purpose will be explained later. In order to strengthen the side walls exterior studs 10 which are preferably made of channel iron are used. Laterally extending brace rods 11 are provided which renders the structure capable of easily resisting the outward pressure of the grain although the bin is made of relatively light material. At each end the bin is rounded in the manner shown in the drawings and each rounded end is surmounted by a semi-conical roof portion which is secured to the upper ends of the side walls by means of lugs which are bent at an angle corresponding to the angle between the roof and the side walls, the roof being secured by means of bolts or in any other suitable manner.

The central portion of the crib roof consists of a frame-work of wood covered with sheet metal plates. The bottom edges of the frame-work are provided with brace rods extending across the bin.

Disposed within the bin is a plurality of vertically extending ventilating pipes. In the present instance I have shown three of these pipes as being disposed on a central line running longitudinally of the bin. Each of these central pipes communicates with a laterally extending pipe disposed between the flooring members 2 and 4 as shown at 12 the ends of the pipes being open to the atmosphere and being provided with screens 13 for preventing the entrance of mice, vermin and so forth.

As will be seen from the drawings the three central pipes 14 are provided with perforations such as those shown at 15 in Figs.

7, 8 and 9. These perforations are preferably made by slitting the metal and beading it or embossing it slightly so as to permit the passage of air but to prevent the passage of rice or grain.

A series of auxiliary pipes 16 is provided the lower ends of these pipes resting on the floor portion 4 being supported in position by means of thimbles 17 (see Fig. 3). The upper ends of the pipes 16 are bent laterally and communicate with the central pipes 14 at points substantially on a line with the upper edges of the side walls. The auxiliary pipes 16 are secured to the central pipes 14 by means of the thimble connection 18 as shown in Fig. 5.

The bin may be provided with doors such as that shown at 19 for charging the bin and other doors such as shown at 20 and 21. The door opening which is adapted to be closed by the door 20 has located therein a frame 22 which is provided with a discharge spout or chute 23 for facilitating the emptying of the bin. Similar discharging means may be used in connection with the door opening which is normally closed by the door 21, as shown in the drawings. It will be observed that the doors 20 and 21 may be closed without interfering with the chutes.

From the foregoing description of the various parts of the device the operation thereof may be readily understood.

In storing rice and similar grains two important points must be observed. An excess of air laden with moisture is detrimental to the grain and the latter cannot be allowed to heat. It will be observed that the side walls of the bin are not perforated except those perforations 9. The latter perforations are too small to permit an excess of moisture laden air to enter the bin but are large enough to permit air to enter very slowly to take the place of the warm air which is drawn out through the central pipes. This warm air which is developed as the grain tends to heat is entrained in the auxiliary pipes 16 and is drawn through them into the central pipes by the upward current of air in the latter which is also due to the fact that the grain tends to heat the central pipes and the air therein thus causing a circulation through the laterally extending pipes 12 upwardly through the central pipes 14 and outwardly at the top thereof.

In certain instances it is not even necessary to provide the row of perforations 9 because it will be understood that the ventilating proceeds slowly although continuously where there is any tendency for the grain to heat. It has been found in practice that the joints between the metal plates and the openings around the doors provide in certain instances, sufficient means for the entrance of air to compensate for that which is drawn out through the auxiliary pipes 16 and thence through the central pipes 14.

The smaller forms of bins are provided with the skids 1 so that they may be drawn along from one place to another thus giving the advantage of a portable bin. The provision of the air space between the floor portions 2 and 4 permits of housing the laterally extending pipes 12 outside of the grain storage space, while the metal flooring 5 prevents the entrance of mice or vermin.

It will be seen that the grain bin is automatically ventilated while at the same time the moisture laden air is prevented from reaching the rice or grain in such quantities as to injure the latter.

The bin may be made in various sizes by separating the end portions and making larger roof portions and also adding side sections to correspond with such extensions. This permits of the enlargement of the bin to suit the demands for storage.

I claim:

1. In a grain storage bin having a bottom including a grain floor, inclosing side walls and roof, a central ventilating pipe extending from the bottom through the roof, with means beneath said floor for supplying air to create an air current, the combination of perforated auxiliary pipes disposed about said central ventilating pipe and resting on the floor, with branches leading to the central ventilating pipe, for drawing heat out of the surrounding grain by virtue of the aforesaid air current in the ventilating pipe.

2. A grain storage bin comprising a receptacle for grain, a central ventilating pipe, a laterally extending cold air pipe communicating with the bottom of said central air pipe, and means for withdrawing heated air and moisture from a plurality of places within said receptacle, said withdrawing means being in communication with said central air pipe.

3. In a grain storage bin having a sheet metal grain receptacle with air perforations, a plurality of main ventilating pipes for said receptacle, and means for supplying air to the bottoms of each of said pipes to create air currents therein; the combination of a plurality of vertically disposed perforated auxiliary heat conducting air pipes distributed about said ventilating pipes with branches at the tops leading thereinto, to conduct the air supplied by the receptacle perforations, and heated by the grain to said central ventilating pipes by virtue of the air currents therein.

4. A grain storage bin comprising a metal receptacle, a plurality of vertically disposed perforated ventilating pipes, a laterally extending cold air pipe communicating with the bottom of each of said vertically disposed ventilating pipes, and a plurality of auxiliary air pipes, the bottoms of said auxiliary air pipes being closed, the sides of said auxiliary air pipes being perforated and their tops being in communication with a vertically disposed ventilating pipe.

5. In a grain storage bin, having a metal receptacle with a bottom having means for admitting air at the bottom, a plurality of vertically disposed perforated ventilating pipes arranged centrally of the bin, and a laterally extending pipe beneath the bottom of the bin for supplying each ventilating pipe with cold air, the combination of a plurality of perforated auxiliary air pipes closed at the lower ends and being bent laterally at the upper ends to communicate with a vertically disposed ventilating pipe, to conduct the air admitted at the bottom of the receptacle and subsequently heated, to said ventilating pipe.

6. A storage bin, comprising a grain receptacle, with a double flooring spaced apart, ventilating pipes in the receptacle passing through the upper floor into the aforesaid space, fresh air conducting means communicating with said pipe in said space, and a plurality of perforated heat conducting pipes grouped about each ventilating pipe, closed at the bottom by abutting the top flooring and communicating at the top with the respective ventilating pipes.

7. A storage bin comprising a grain receptacle, with a main floor and a sub-floor spaced therefrom; a perforated ventilating pipe in the receptacle and extending through the main floor, means carried by the sub floor providing a mounting for said pipe, and laterally disposed air pipes occupying the aforesaid space and leading to the extension of said ventilating pipe.

8. In a storage bin, an air conducting pipe with parallel slits beaded to form openings sufficiently large for the passage of air, but insufficiently large to permit grain to fall in.

9. A storage bin, comprising a receptacle with a main and sub floor, a ventilating pipe with an extension through the main floor, connecting and mounting means operatively associated with said extension, said connecting means including a plurality of radiating thimbles, and lateral air pipes between said floors, fitted on the connecting means.

10. A storage bin, comprising a sheet metal receptacle with air openings around the bottom, and including spaced main and sub flooring, a plurality of ventilating pipes disposed in the receptacle with extensions through the main floor, and mounting means on the sub-floor; lateral air pipes in said space leading to said extensions, perforated air conducting pipes disposed about each ventilating pipe with thimble connections to the main floor where they are closed and leading to the respective ventilating pipes, a metallic flooring covering the main floor and holding said thimble connections in place, and means for connecting said flooring to the sheet metal receptacle beneath said air openings.

11. In a storage bin, a double floor spaced apart, and a plurality of screen-ended air pipes located in the space between the floors, and terminating in a ventilating pipe extending through one of the floors.

LIZZIE H. DICKELMAN.